(12) United States Patent
Jagtiani et al.

(10) Patent No.: US 8,799,284 B2
(45) Date of Patent: Aug. 5, 2014

(54) METHOD FOR AUTOMATED SCALING OF A MASSIVE PARALLEL PROCESSING (MPP) DATABASE

(71) Applicant: FutureWei Technologies, Inc., Plano, TX (US)

(72) Inventors: Kamini Jagtiani, Sunnyvale, CA (US);
Siew Sim-Tang, Saratoga, CA (US);
Yang Sun, Palo Alto, CA (US);
Gangavara Prasad Varakur, Danville, CA (US)

(73) Assignee: Futurewei Technologies, Inc., Plano, TX (US)

( * ) Notice: Subject to any disclaimer, the term of this patent is extended or adjusted under 35 U.S.C. 154(b) by 118 days.

(21) Appl. No.: 13/691,402

(22) Filed: Nov. 30, 2012

(65) Prior Publication Data
US 2014/0156666 A1   Jun. 5, 2014

(51) Int. Cl.
G06F 17/30 (2006.01)
(52) U.S. Cl.
CPC ............................. G06F 17/30707 (2013.01)
USPC .......................................... 707/736; 711/105
(58) Field of Classification Search
None
See application file for complete search history.

(56) References Cited

U.S. PATENT DOCUMENTS

| | | | |
|---|---|---|---|
| 7,203,686 B1 | 4/2007 | Sinclair et al. | |
| 7,299,239 B1 | 11/2007 | Basu et al. | |
| 7,640,244 B1 | 12/2009 | Morris et al. | |
| 2005/0187977 A1 | 8/2005 | Frost | |
| 2008/0301132 A1* | 12/2008 | Yamada et al. | 707/5 |
| 2009/0307713 A1* | 12/2009 | Anderson et al. | 719/313 |
| 2010/0030995 A1 | 2/2010 | Wang et al. | |
| 2010/0274981 A1* | 10/2010 | Ichikawa | 711/162 |
| 2010/0281027 A1 | 11/2010 | Duan et al. | |
| 2011/0107327 A1* | 5/2011 | Barkie et al. | 717/176 |
| 2011/0179246 A1 | 7/2011 | Kim | |
| 2012/0109888 A1 | 5/2012 | Zhang et al. | |
| 2012/0109892 A1 | 5/2012 | Novik et al. | |

(Continued)

FOREIGN PATENT DOCUMENTS

| | | |
|---|---|---|
| CN | 101639835 A | 2/2010 |
| CN | 101876983 A | 11/2010 |

(Continued)

OTHER PUBLICATIONS

International Search Report and Written Opinion received in International Application No. PCT/CN2013/088276 mailed Mar. 6, 2014, 11 pages.

(Continued)

*Primary Examiner* — Wilson Lee
(74) *Attorney, Agent, or Firm* — Slater & Matsil, L.L.P.

(57) ABSTRACT

A massively parallel processing (MPP) database can be re-partitioned/re-balanced while remaining on-line through a staged migration procedure. Staged migration may include a first stage and a second stage. During the first stage, entries in an existing partition are reallocated to the new partition, and the catalog is updated to associate the re-allocated entries with both the existing partition and the new partition such that queries for the re-allocated entries are directed toward the existing partition and the new partition. During the second stage, the re-allocated entries are migrated from the existing partition to the new partition, and after the migration is complete, the catalog is re-updated to associate the migrated entries with the new partition such that new queries are directed toward the new partition.

22 Claims, 8 Drawing Sheets

(56) References Cited

U.S. PATENT DOCUMENTS

2012/0109926 A1   5/2012   Novik et al.
2014/0101379 A1*  4/2014   Tomlin .................. 711/103
2014/0122484 A1   5/2014   Jagtiani et al.

FOREIGN PATENT DOCUMENTS

| CN | 101916261 A  | 12/2010 |
| CN | 102426602 A  | 4/2012  |
| CN | 102521234 A  | 6/2012  |
| WO | 03009178 A3  | 1/2003  |

OTHER PUBLICATIONS

International Search Report received in Application No. PCT/CN2013/086139, mailed Feb. 20, 2014, 11 pages.

\* cited by examiner

METHOD FOR AUTOMATED SCALING OF A MASSIVE PARALLEL PROCESSING (MPP) DATABASE

TECHNICAL FIELD

The present disclosure relates to massively parallel processing (MPP) databases and, in particular embodiments, to a method for automated scaling of an MPP database.

BACKGROUND

Massively parallel processing (MPP) is the coordinated processing of a program by multiple processors, with each processer working on different parts of the program. The processors communicate with one another to complete a task with each of them using their own operating system and memory resources. An MPP database system is based on shared-nothing architecture, with the tables of its databases being partitioned into segments and distributed to different processing nodes. There is no data sharing among the processing nodes. When database queries arrive, the work of each query is divided and assigned to one of the processing nodes according to a data distribution plan and an optimized execution plan. The processing entities in each processing node manage only their portion of the data. However, these processing entities may communicate with one another to exchange necessary information during their work execution. A query may be divided into multiple sub-queries, and the sub-queries may be executed in parallel or in some optimal order in some or all the processing nodes. The results of the sub-queries may be aggregated and further processed, and subsequently more sub-queries may the executed according to the results.

One challenge in MPP systems is maintaining efficient scaling as data is added to the MPP database. More specifically, an MPP database is generally created by partitioning one or more tables between multiple database partitions (DBpartitions) using an algorithm (e.g., hash, range, etc.). As new data is added to the MPP database, new data entries are made to tables within the DBpartitions according to the algorithm. However, the algorithm for partitioning data in conventional MPP databases is set during creation of the MPP database, and remains the same throughout the life of the MPP database. Hence, the static algorithm may be incapable of evolving to changing conditions, thereby causing the underlying MPP database to become unbalanced and less efficient at processing queries over time.

By way of example, suppose a conventional customer database is partitioned based on the sex of its account holders, with database entries corresponding to male account holders being stored in a different DBpartition than database entries corresponding to female account holders. This algorithm may have been chosen because there was a relatively even ratio of male account holders to female account holders when the MPP database was initially created. However, as time goes on, assume female account holders are added to the database at a much higher rate than male account holders, thereby causing the MPP database to become un-balanced (i.e., the second DBpartition becomes much larger than the first DBpartition). At some point, it becomes desirable to repartition the MPP database in order to rebalance the DBpartitions. Conventionally, repartitioning the MPP database is performed manually by the database administrator (DBA), which typically requires the MPP database to go offline for a period of time. Accordingly, mechanisms that allow the MPP databases to be re-partitioned without interrupting their runtime operation are desired.

SUMMARY OF THE INVENTION

Technical advantages are generally achieved, by embodiments of the present invention which describe systems and methods for automated scaling of MPP databases.

In accordance with an embodiment, an apparatus a method for managing a massively parallel processing (MPP) database is provided. In this example, the method includes determining that a criteria for rebalancing an existing partition of the MPP database has been satisfied, re-allocating a set of entries from the existing partition to a new partition, and updating a catalog to associate the set of entries with both the existing partition and the new partition such that queries for the set of entries received during a migration period are directed toward the existing partition and the new partition. The method further includes migrating the set of entries from the existing partition to the new partition, and re-updating the catalog to associate the set of entries with the new partition after migrating the set of entries from the existing partition to a new partition. An apparatus for performing this method is also provided.

In accordance with another embodiment, another method of managing a massively parallel processing (MPP) database is provided. In this example, the method includes determining that a criteria for repartitioning an existing database partition (DBpartition) of the MPP database has been satisfied. The existing DBpartition comprises a first partition of a first table (t1-p1) and a first partition of a second table (t2-p1). The method further includes re-allocating a first set of entries in the t1-p1 and a second set of entries in the t2-p1 to a new DBpartition, and updating a catalog to associate the first set of entries and the second set of entries with both the existing DBpartition and the new DBpartition such that queries for the re-allocated entries received during a migration period are directed toward both the existing DBpartition and the new DBpartition. The method further includes migrating the first set of entries and the second set of entries from the existing DBpartition to the new DBpartition, and re-updating the catalog to associate the first set of entries and the second set of entries with the new DBpartition after migrating the set of entries from the existing DBpartition to the new DBpartition. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

The present disclosure will be described with respect to preferred embodiments in a specific context, namely a massively parallel processing (MPP) database and management thereof. The concepts in the disclosure may also apply, however, to other types of databases and data management systems.

Aspects of this disclosure provide mechanisms for repartitioning an MPP database without interrupting the runtime operation of the MPP database. More specifically, embodiments of this disclosure allow entries of an existing DBpartition to be migrated into a new DBpartition while the MPP database remains online. This is achieved through staged updates to the query catalog. For instance, a first staged update of the catalog occurring before migration may serve to update indexes in the catalog to associate migrated entries with both the existing DBpartition and the new DBpartition during the migration period. As a result, queries received during the migration period will be directed first to the existing DBpartition and then to the new DBpartition. To wit, the new DBpartition is searched only after failing to locate the queried entry in the existing DBpartition. Since each entry is written to the new DBpartition before being deleted/removed from the existing DBpartition, the staged search of the existing and new DBpartitions ensures that query errors are avoided.

Further, aspects of this disclosure provide a mechanism for preserving primary-key/foreign-key relationships during the migration period. Specifically, MPP databases comprising two or more tables may be partitioned in a manner that associates corresponding entries in different tables in accordance with a primary-key/foreign-key relationship, as described in U.S. patent application Ser. No. 13/663,237 filed Oct. 29, 2012 and entitled "System and Method for Flexible Distributed Massively Parallel Processing (MPP) Database," which is incorporated herein by reference as if reproduced in its entirety. For MPP databases partitioned in this manner, it is desirable to preserve primary-key/foreign-key relationships during the migration period. Aspects of this disclosure achieve this by migrating batches or tuples of corresponding entries concurrently such that corresponding entries are written into the new DBpartition at the same time.

Figure 1:
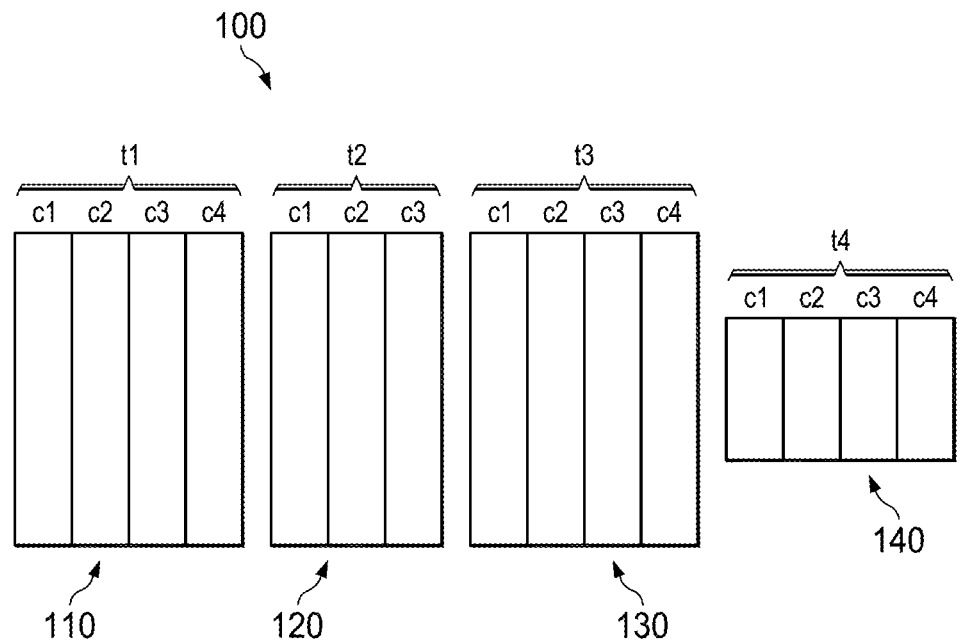
FIG. 1 illustrates a diagram of a database.

FIG. 1 illustrates an example of a conventional database 100 comprising a plurality of tables 110-140, including a first table (t1) 110, a second table (t2) 120, a third table (t3) 130, and a fourth table (t4) 140. The tables 110-140 may differ in size, and may include different numbers of columns. For instance, the t1 110 includes four columns (t1.c1, t1.c2, t1.c3, and t1.c4), while the t4 140 includes three columns (t4.c1, t4.c2, and t4.c3).

Figure 2:
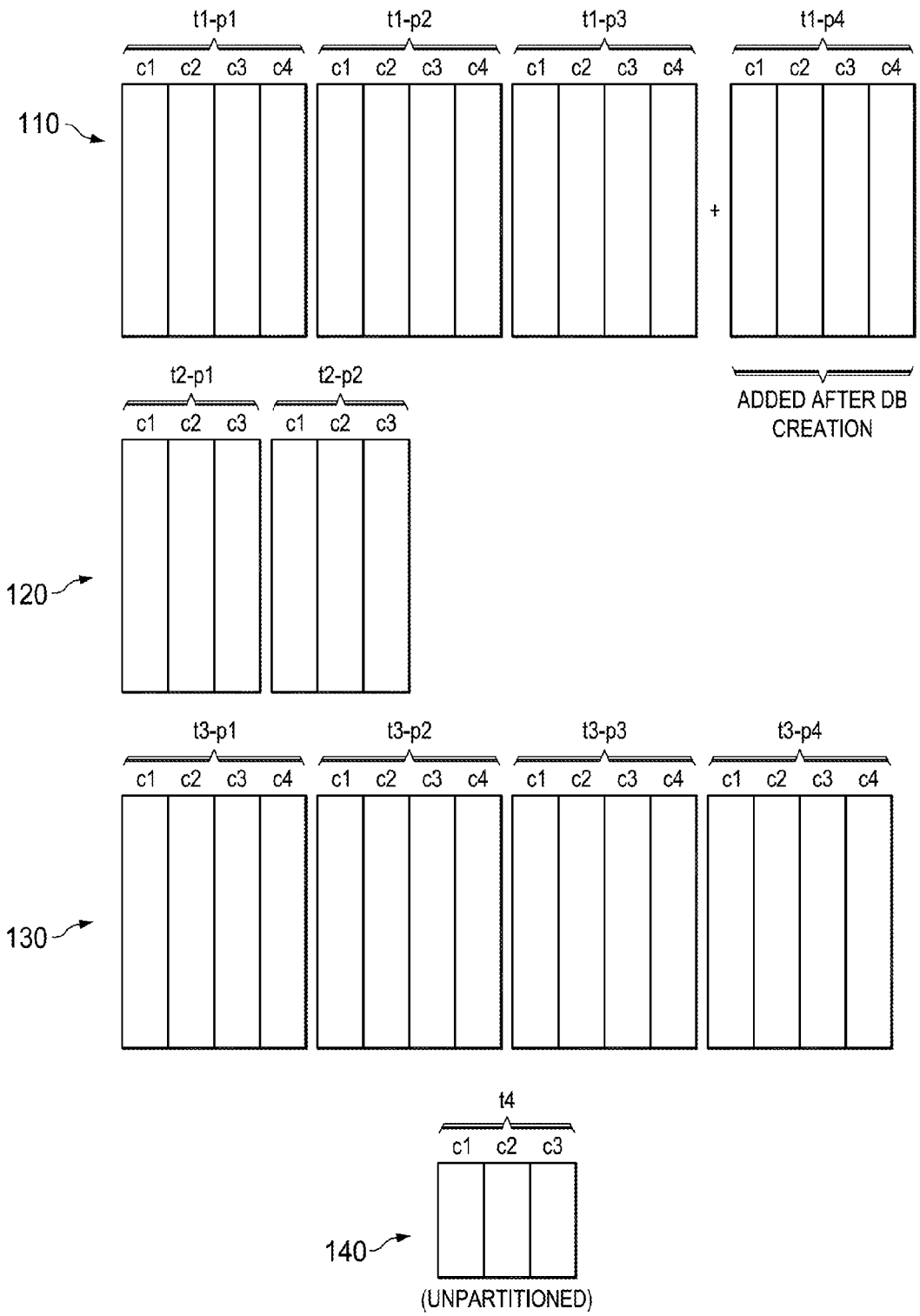
FIG. 2 illustrates a diagram of an MPP database comprising table partitions.

As the tables 110-140 are filled with additional data, the database 100 may become too large for a single processor to efficiently handle. Accordingly, it may be beneficial to partition the database 100 in accordance with an MPP scheme. FIG. 2 illustrates a conventional MPP database 200 in which the tables (t1-t4) 110-140 have been divided into table partitions. More specifically, the t1 110 has been divided into three partitions (t1-p1, t1-p2, t1-p3), the t2 120 has been divided into two partitions (t2-p1, t2-p2), the t3 130 has been divided into three partitions (t3-p1, t3-p2, t3-p3, and t3-t4), and the t4 140 remains un-partitioned. Each of the table partitions (t1-p1, t1-p2, t1-p3, t2-p1, etc.) reside on a different memory or storage device assigned to a different processor.

In the conventional MPP database 200, table partitions can be added during runtime operation. For instance, as data is entered into the t4 140, a fourth partition (t1-p4) may be added. While the addition of the t1-p4 may add capacity, it does not allow for rebalancing between the t1-p1, t1-p2, and t1-p3 because conventional MPP schemes only allow new data to be stored in the t1-p4. For example, if the t1-p1 is filled much faster than the t1-p2, then adding the t1-p4 will not alleviate the imbalance in the t1 110 because, when using conventional techniques, data cannot be moved from the t1-p1 to the t1-p4 without taking the conventional MPP database database 200 offline (i.e., interrupting runtime operation).

Figure 3:
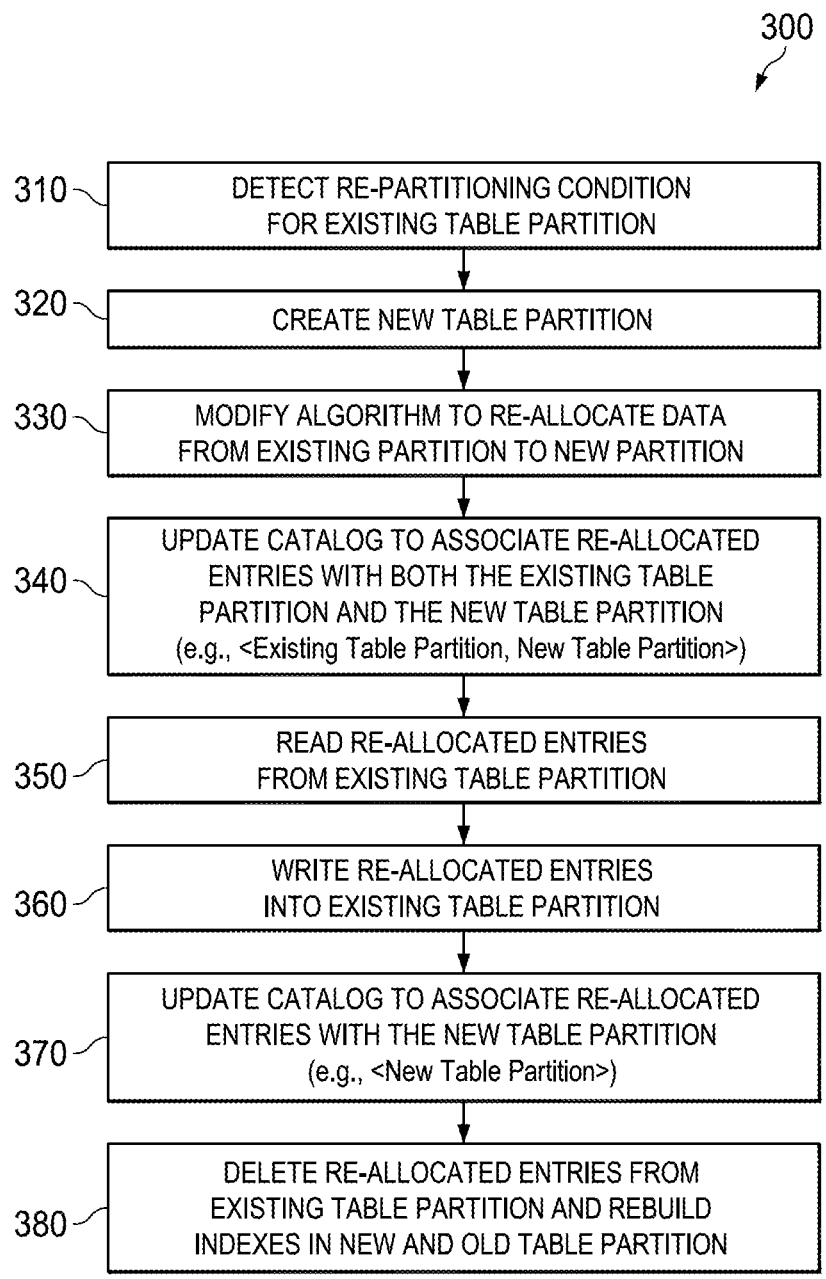
FIG. 3 illustrates a flow chart of a method for re-balancing an existing table partition without interrupting the run-time operation of the MPP database.

Aspects of this disclosure provide a mechanism for re-partitioning an MPP database without interrupting a runtime operation of the MPP database. FIG. 3 illustrates a method 300 for re-provisioning an existing table partition, as may be performed autonomously by an MPP database system. The method begins at step 310, were a re-partitioning condition is detected for an existing table partition. The condition may include that a characteristic of the existing table partition has exceeded a threshold. For instance, if the condition may be met when the size of the existing table partition exceeds a threshold. Alternatively, the condition may be based on a hotness (e.g., query frequency) of the existing table partition, or a read/write pattern of the existing table partition. In addition, the condition may comprise a time-based (periodic) condition, user-defined condition, a manually triggered condition, or any other condition, as determined by a DBA.

Next, the method 300 proceeds to step 320, where a new table partition is created. Thereafter, the method 300 proceeds to step 330, where the algorithm (e.g., Hash, range, or otherwise) is modified to re-allocate data from the existing table partition to the new table partition.

Next, the method 300 proceeds to step 340, where a catalog for directing queries is updated so as to associate re-allocated entries with both the existing table partition and the new table partition (e.g., <Existing table Partition, New table partition>). To wit, a query related to one of the re-allocated entries will be first directed to the existing table partition, and then to the new table partition (if the entry is not found in the existing table partition). Thereafter, the method 300 proceeds to step 350, where reallocated entries are read from the existing table partition. Notably, this read operation does not serve to delete/remove the reallocated entries from the existing table partition. Next, the method proceeds to step 360, where the re-allocated entries are written into the new table partition. Thereafter, then the method 300 proceeds to step 370, where the catalog table is updates to associate the re-allocated entries with the new table partition. In embodiments, the step 370 may include removing the existing table partition association, e.g., <New DBpartition>. Finally, the method 300 proceeds to step 380, where the migrated entries are deleted from the existing table partition and indexes within the new and old table partitions are rebuilt.

Figure 4:
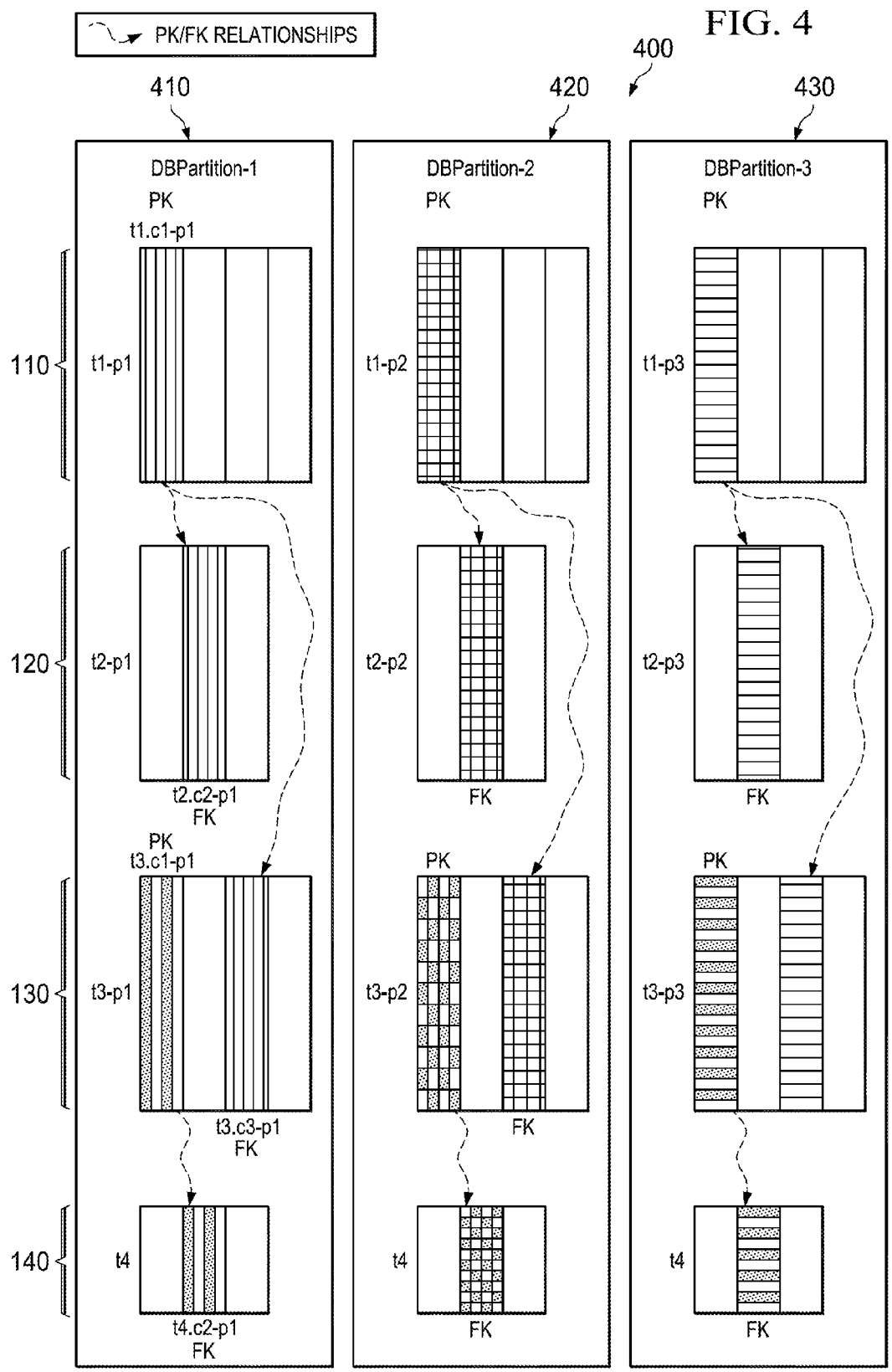
FIG. 4 illustrates a diagram of an embodiment MPP database comprising DBpartitions.

The above described mechanism for re-partitioning an existing table partition can also be applied to re-partition an existing DBpartition. DBpartitions result when an MPP database is built in the manner described by U.S. patent application Ser. No. 13/663,237. FIG. 4 illustrates an embodiment of a massively parallel processing (MPP) database 400 in which the tables 110-140 are divided amongst a plurality of database partitions (DBpartitions) 410-430. As shown, each of the DBpartitions 410-430 comprises a portion of each of the tables 110-140.

Notably, while the t1 110 is partitioned amongst the DBpartitions 410-430 according to an algorithm (e.g., hash, range, etc.), the t2-t4 120-140 are partitioned amongst the DBpartitions 410-430 according to primary-key/foreign-key relationships. More specifically, the first column of the t1 110 is designated as the primary key (PK) of the t1 110, and the t1 110 is partitioned amongst the DBpartitions 410-430 by applying the algorithm (e.g., hash, range, etc.) to the primary key. Further, the second column of the t2 120 is designated as the foreign key (FK) of the t2 120, and the t2 120 is partitioned amongst the DBpartitions 410-430 in accordance with a relationship between the PK of the t1 110 and the FK of the t2 120. To wit, entries of the t2 120 are selected for inclusion in the t2-p1 by matching the FK values of the second column of the t2-p1 (t2.c2-p1) to the PK values of the first column of the t2-p1(t2.c2-p1). The same holds true for the t3-p1, where the PK values in the third column of the t3-p1(t2.c3-p1) match the PK values of the first column of the t2-p1(t2.c2-p1).

However, the t4 140 does not share any common columns with the t1 110, and therefore does not have an explicit primary-key/foreign key relationship with the t4 140. Instead, the t4 140 shares primary-key/foreign key relationship with the t3 130, as the second column of the t4 (t4.c2) and the first column of the t3 (t3.c1) share a common unit (e.g., account number, etc.). Hence the t4 140 is partitioned amongst the DBpartitions 410-430 in accordance with a relationship between the PK of the t3 130 and the FK of the t4 140. To wit, entries of the t4 140 are selected for inclusion in the t4-p1 by matching the FK values of the second column of the t4 (t4.c2) to the PK values of the first column of the t2-p1(t3.c1-p1). Table 1 shows how a summary of how the tables are partitioned amongst the DBpartitions 410-430.

TABLE 1

|  | DBpartition 410 | DBpartition 420 | DBpartition 430 |
| --- | --- | --- | --- |
| t1 110 | f(t1.c1) | f(t1.c1) | f(t1.c1) |
| t2 120 | t2.c2-p1 = t1.c1-p1 | t2.c2-p2 = t1.c1-p2 | t2.c2-p3 = t1.c1-p3 |
| t3 130 | t3.c3-p1 = t1.c1-p1 | t3.c3-p2 = t1.c1-p2 | t3.c3-p3 = t1.c1-p3 |
| t4 140 | t4.c2-p1 = t3.c1-p1 | t4.c2-p2 = t3.c1-p2 | t4.c2-p3 = t3.c1-p3 |

Figure 5:
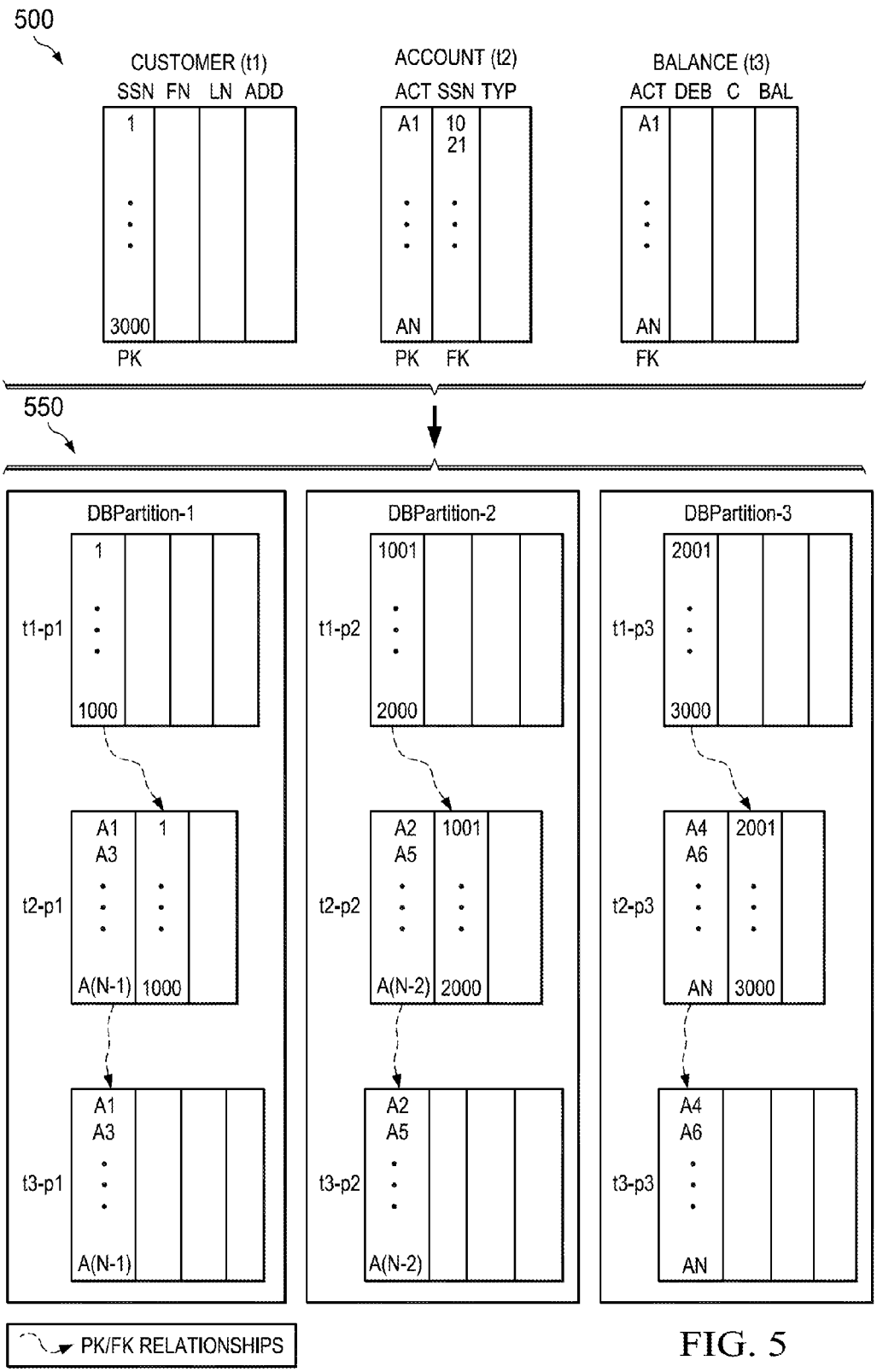
FIG. 5 illustrates a diagram of an embodiment MPP customer database comprising DBpartitions.

FIG. 5 illustrates a practical example of a database 500 can be partitioned into a MPP database 550 in accordance with DB partitioning. As shown, the database 500 includes a customer table (t1), an account table (t2), and a balance table (t3). The customer table (t1) includes four columns for each customer's social security number (SSN), first name (FN), last name (LN), and address (add). The Account table (t2) includes three columns for each account's account number (ACT), the SSN of the customer named on the account, and the type of account (TYP). The balance table (t3) includes four columns for each account number (ACT), debits (DEB), credits (Cred), and balance (Bal).

When partitioning the database 500, the customer table (t1), account table (t2), and balance table (t3) may be associated with one another in accordance with a primary-key/foreign-key relationship. For instance, a primary-key/foreign-key relationship between the customer table (t1) and the Account table (t2) may rely on the SSN column of those respective tables, with the SSN column being deemed a primary key for the customer table (t1) and a secondary column of the Account table (t2). However, the balance table (t3) does not have a SSN column, and, in fact, shares no common columns with the customer table (t1) in this example. Hence, a primary-key/foreign-key relationship may instead be established between the balance table (t3) and the Account table (t2) using the ACT column of those respective tables. Note, a table's foreign key and primary key may, in some instances, be the same column. Further, a table's primary key does not necessarily have to be the first column of the table.

In this example, the database 500 is partitioned into the MPP database 550 by applying a range algorithm to the primary key (i.e., SSN column) of the customer table (t1). More specifically, t1 entries having an SSN value between 1-1000 are allocated to the DBPartition-1, t1 entries having an SSN value between 1001-2000 are allocated to the DBPartition-2, and t1 entries having an SSN value between 2001-3000 are allocated to the DBPartition-3. Although FIG. 5 is discussed in the context of a range partition, the concepts exemplified therein are equally applicable to other partitioning algorithms (e.g., hash, etc.).

The account table (t2) and balance table (t3) are partitioned in accordance with their respective primary-key/foreign-key relationships. To wit, t2 entries are partitioned amongst the DBPartition-1, DBPartition-2, and DBPartition-3 based on the primary-key/foreign-key relationship between the Account table (t2) and the customer table (t1). Hence, a first collection of t2 entries having an SNN value between 1-1000 are allocated to the DBPartition-1, a second collection of t2 entries having an SNN value between 1001-2000 are allocated to the DBPartition-2, and a third collection of t2 entries having an SNN value between 2001-3000 are allocated to the DBPartition-3.

Similarly, the balance table (t3) is partitioned amongst the DBPartition-1, DBPartition-2, and DBPartition-3 based on the primary-key/foreign-key relationship between the balance table (t3) and the account table (t2). To wit, t3 entries having an ACT value matching that of t2 entries within t2-p1 are allocated to the DBPartition-1, t3 entries having an ACT value matching that of t2 entries within t2-p2 are allocated to the DBPartition-2, and t3 entries having an ACT value matching that of t2 entries within t2-p3 are allocated to the DBPartition-3.

Figure 6:
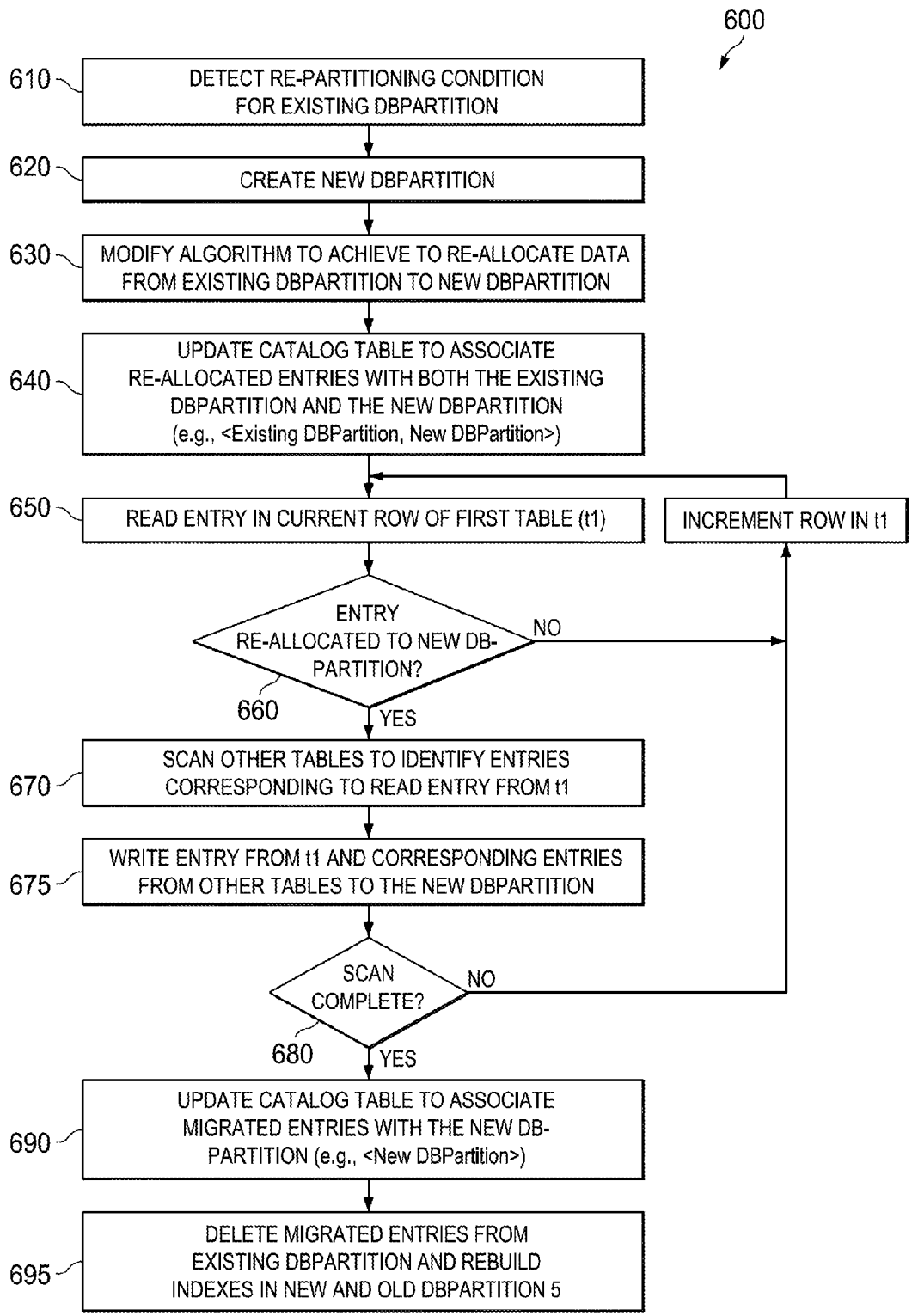
FIG. 6 illustrates a flow chart of a method for re-balancing an existing DBpartition without interrupting the run-time operation of the MPP database

Despite its advantages over traditional table partitions, DBpartitions may become unbalanced as data is added to the MPP database. Aspects of this disclosure provide a mechanism for re-partitioning a DBpartition without interrupting the runtime operation of the underlying MPP database. FIG. 6 illustrates a method 600 for re-partitioning an existing DBpartition, as may be performed autonomously by an MPP database system. The method begins at step 610, were a re-partitioning condition is detected for an existing DBpartition. Detecting the re-partitioning condition may include detecting that a characteristic of the existing DBpartition has exceeded a threshold. For instance, if the condition may be met when the size of the existing DBpartition exceeds a threshold, or if an individual table within the existing DBpartition exceeds a threshold. Alternatively, the condition may be based on a hotness (e.g., query frequency) of the existing DBpartition, or a read/write pattern of the existing DBpartition. In addition, the condition may comprise a time-based (periodic) condition, user-defined condition, a manually triggered condition, or any other condition, as determined by a DBA.

Next, the method 600 proceeds to step 620, where a new DBpartition is created. Thereafter, the method 600 proceeds to step 630, where the algorithm (e.g., hash, range, or otherwise) is modified to re-allocate data from the existing DBpartition to the new DBpartition. For instance, assume a range algorithm says the existing DB comprises entries having a SSN between 1-1000. In this case, the range algorithm may be modified to re-allocate entries having a SSN between 1-500 to the new DBpartition, while leaving entries having an SSN between 501-1000 allocated to the exiting DBpartition.

Next, the method 600 proceeds to step 640, where a catalog for directing queries is updated in order to associate re-allocated entries with both the existing DBpartition and the new DBpartition (e.g., <Existing DBpartition, New DBpartition>). To wit, a query related to one of the re-allocated entries will be first directed to the Existing DBpartition, and then (if the entry is not found in the existing DBpartition) to the new DBpartition. Thereafter, the method 600 proceeds to step 650, where an entry in a first row of the first table (t1) is read. Here, the first table (t1) refers to the table that has the distribution determining column. Next, the method proceeds to step 660, where it is determined whether the read entry has been re-allocated to the new DBpartition as a result of the modification to the algorithm in step 630. The procedure for making this determination may depend largely on the type of partitioning algorithm being used. For instance, if a range algorithm is used, then step 660 may include determining whether a value of the entry falls within the range being re-allocated to the new DBpartition. Alternatively, if a hash algorithm is used, then step 660 may include applying the updated hash function to the entry to obtain a hash value, and then determining whether the hash value has been re-allocated to the new DBpartition.

If the entry has not been re-allocated to the new DBpartition, then the instant row of the first table (t1) is incremented, and the method 600 reverts back to step 650. If the read entry has been re-allocated to the new DBpartition, then the method 600 proceeds to step 670, where the other tables (e.g., t2-t3) are scanned to determine whether any of the other tables include entries corresponding to read entry. Thereafter, the method 600 proceeds to step 675, where the read entry from the first table (t1) and the corresponding entries from the other tables are written into the new DBpartition.

Next, the method 600 proceeds to step 680, where it is determined whether the scan is complete, as may be the case when the last row of the first table (t1) has been evaluated. If the scan is not complete, then the instant row of the first table (t1) is incremented, and the method 600 reverts back to step 650. If the scan is complete, then the method 600 proceeds to step 690, where the catalog table is updates to associate the migrated entries with the new DBpartition. In embodiments, the updating the catalog in step 690 may include removing the previous existing DB association, e.g., <New DBpartition>. Finally, the method 600 proceeds to step 695, where the migrated entries are deleted from the existing DBpartition and indexes within the new and old DBpartitions are rebuilt.

Figure 7:
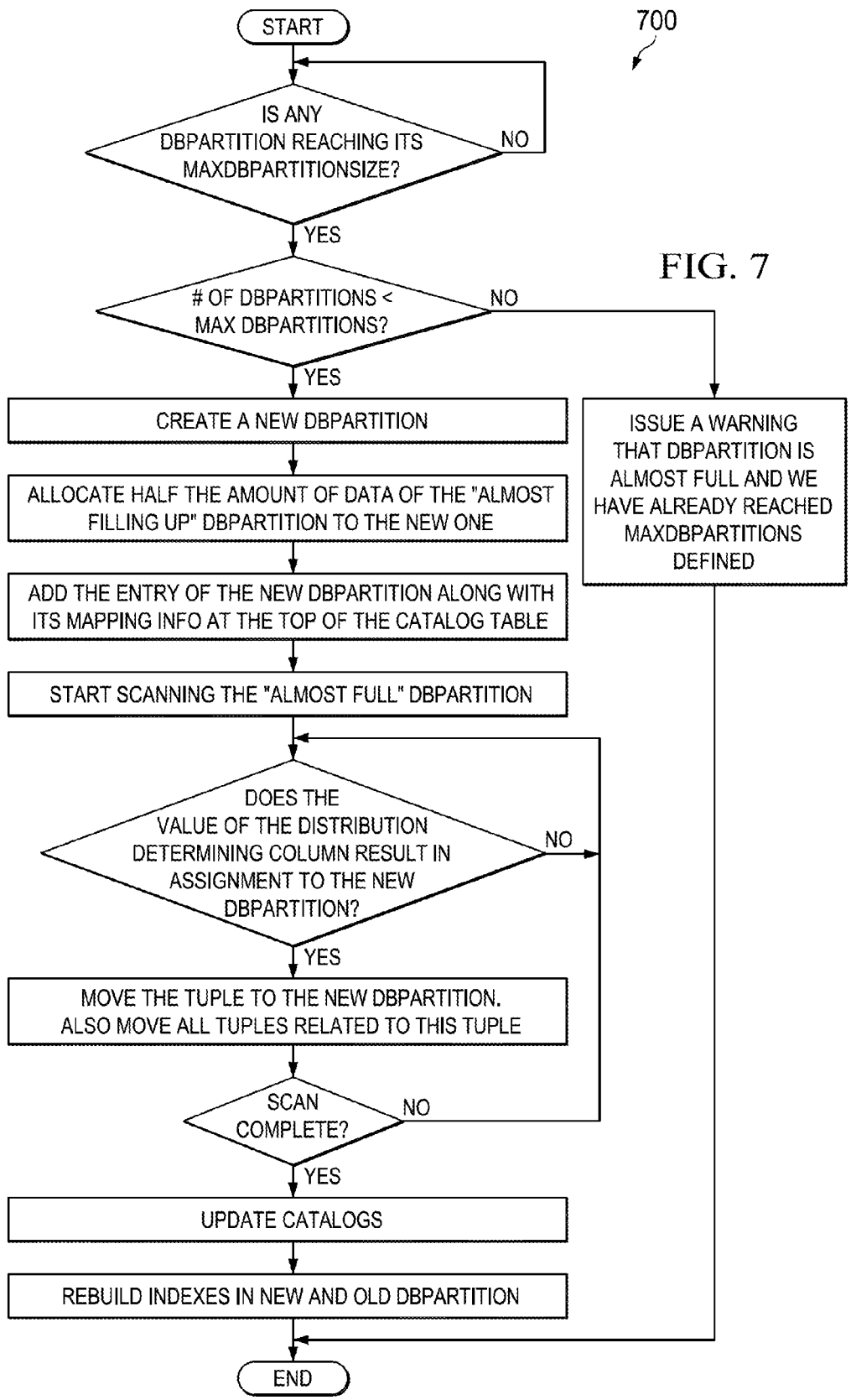
FIG. 7 illustrates an embodiment method for auto-creation of a new DBPartition.

FIG. 7 illustrates an embodiment method 700 for auto-creation of a new DBPartition when the MPP database is originally partitioned in accordance with a range algorithm. The method 700 begins with checking if there is any DBPartition which is reaching its max size. The "reaching" parameter can be configurable-when it is 90% of the MAXDBPARTITIONSIZE or 95% of MAXDBPARTITIONSIZE. It can be controlled by the DBA. If the DBPartition1 is reaching its limit, then it is determined whether the MPP database has already reached the MAXDBPARTITIONS defined for this schema. If so, then warnings and alerts are issued to indicate that a particular DBPartition1 is approaching its limit. If MAXDBPARTITIONS has not been reached, then a new DBPartition is created. The buckets that are being handled by DBPartition1 are divided into half, with one half of the buckets being assigned to the new DBPartition_new. A new entry is added to the catalog mapping the DBPartition to its buckets.

For instance DBPartition1 was handling all buckets from 0-1000. When it starts getting full, DBPartition1 will continue to handle 0-499 and 500-1000 will be assigned to DBPartition_new. Now any insert that happens whose hash bucket turns out to be in between 500-1000 will directly go to DBPartition_new. Meanwhile in the background, the tuples which are located in DBPartition1 but the hashable column gets hashed to buckets 500-1000 gets moved to DBPartition_new.

Figure 8:
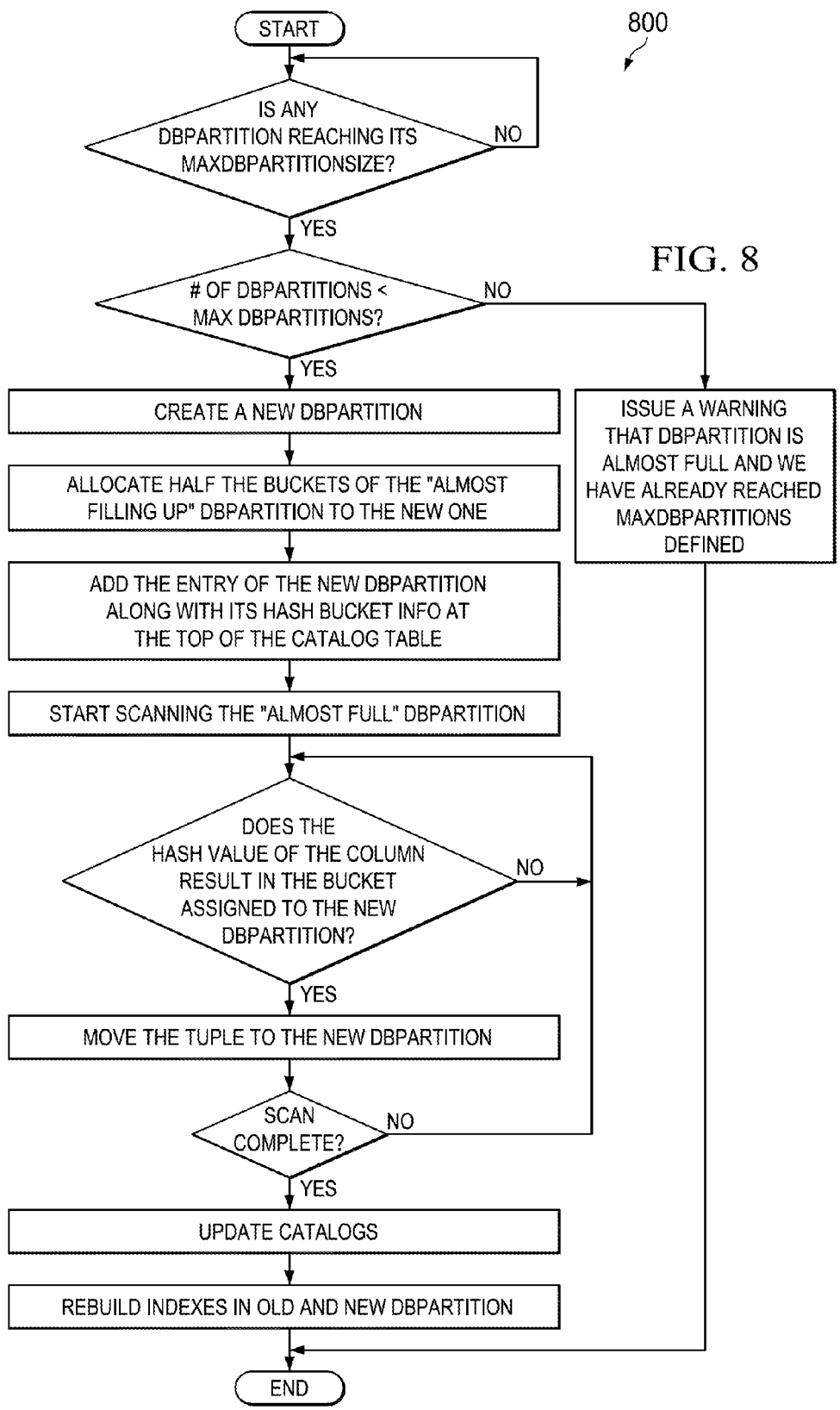
FIG. 8 illustrates another embodiment method for auto-creation of a new DBPartition.

FIG. 8 illustrates an embodiment method 800 for auto-creation of a new DBPartition when the MPP database is originally partitioned in accordance with a hash algorithm. The method 800 is similar to the method 800, except that the scanning procedures differs to accommodate the differences between range and hash re-allocation. Specifically, the method 800 determines whether the value of the distribution determining column result in assignment to the DBPartition_new. If not, the method 800 proceeds to the next row. If the value of the distribution determining column results in assignment to the DBPartition_new, then then all related entries (i.e., including entries in other tables) are migrated to the DBPartition_new.

Figure 9:
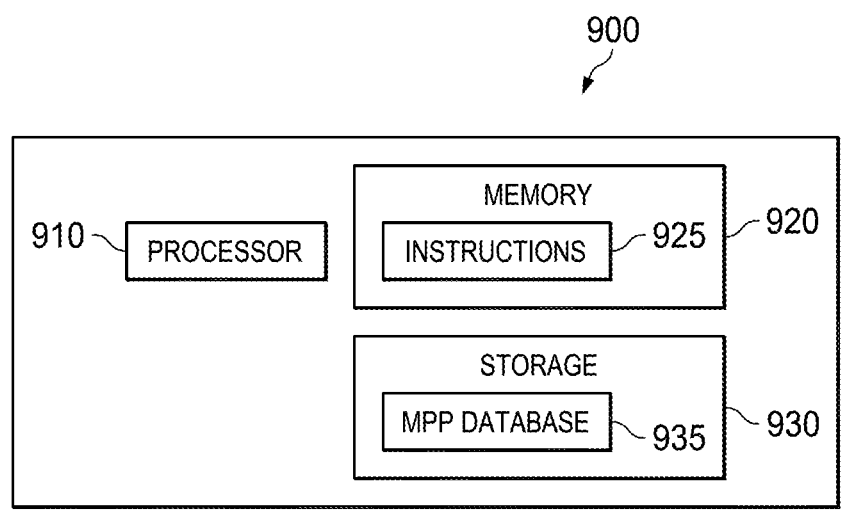
FIG. 9 illustrates a diagram of an embodiment device for re-balancing an existing DBpartition without interrupting the run-time operation of the MPP database.

FIG. 9 illustrates an apparatus 900 for re-balancing a massively parallel processing database. The apparatus includes a processor 910, a memory 920 storing computer readable instructions 925 for execution by the processor 910, and a storage 930 comprising an MPP database 935. Notably, the MPP database 935 may correspond to a table or DBpartition of a larger MPP database, and the processor 910 may be one of many parallel processors for managing and providing the larger MPP database.

While the disclosure provides illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method for managing a massively parallel processing (MPP) database, the method comprising:
   determining that a criteria for rebalancing an existing partition of the MPP database has been satisfied;
   re-allocating a set of entries from the existing partition to a new partition;
   updating a catalog to associate the set of entries with both the existing partition and the new partition, wherein updating the catalog causes queries for the set of entries received during a migration period to be directed toward the existing partition and the new partition;
   migrating the set of entries from the existing partition to the new partition; and
   re-updating the catalog to associate the set of entries with the new partition after migrating the set of entries from the existing partition to a new partition.

2. The method of claim 1, wherein re-updating the catalog to associate the set of entries with the new partition comprises removing an association between the set of entries and the existing partition.

3. The method of claim 1, wherein the set of entries are migrated from the existing partition to the new partition without interrupting a runtime operation of the MPP database.

4. An apparatus comprising:
a processor; and
a computer readable storage medium storing programming for execution by the processor, the programming including instructions to:
determine that a criteria for rebalancing an existing partition of a massively parallel processing (MPP) database has been satisfied;
re-allocate a set of entries from the existing partition to a new partition;
update a catalog to associate the set of entries with both the existing partition and the new partition, wherein updating the catalog causes queries for the set of entries received during a migration period to be directed toward the existing partition and the new partition;
migrate the set of entries from the existing partition to a new partition; and
re-update the catalog to associate the set of entries with the new partition after migrating the set of entries from the existing partition to a new partition.

5. The apparatus of claim 4, wherein the instruction to re-update the catalog to associate the set of entries with the new partition include instructions to remove an association between the set of entries and the existing partition.

6. The apparatus of claim 4, wherein the set of entries are migrated from the existing partition to the new partition without interrupting a runtime operation of the MPP database.

7. A method of managing a massively parallel processing (MPP) database, the method comprising:
determining that a criteria for repartitioning an existing database partition (DBpartition) of the MPP database has been satisfied, wherein the existing DBpartition comprises a first partition of a first table (t1-p1) and a first partition of a second table (t2-p1);
re-allocating a first set of entries in the t1-p1 and a second set of entries in the t2-p1 to a new DBpartition; and
updating a catalog to associate the first set of entries and the second set of entries with both the existing DBpartition and the new DBpartition, wherein updating the catalog causes queries for the re-allocated entries received during a migration period to be directed toward both the existing DBpartition and the new DBpartition;
migrating the first set of entries and the second set of entries from the existing DBpartition to the new DBpartition; and
re-updating the catalog to associate the first set of entries and the second set of entries with the new DBpartition after migrating the set of entries from the existing DBpartition to the new DBpartition.

8. The method of claim 1, wherein re-updating the catalog to associate the first set of entries and the second set of entries with the new DBpartition comprises:
removing an association between the first set of entries and the existing DBpartition such that queries for the first set of entries are directed to the new DBpartition without being directed to the existing DBpartition; and
removing an association between the second set of entries and the existing DBpartition such that queries for the second set of entries are directed to the new DBpartition without being directed to the existing DBpartition.

9. The method of claim 8, wherein the first set of entries and the second set of entries are migrated from the existing partition to the new partition without interrupting a runtime operation of the MPP database.

10. The method of claim 7, wherein the t1-p1 was initially allocated to the existing DBpartition in accordance with an algorithm applied to a primary key of the first table, and wherein the t2-p1 was initially allocated to the first DBpartition in accordance with a primary-key/foreign-key relationship specifying an association between the primary key of the first table and a foreign key of the second table.

11. The method of claim 10, wherein re-allocating the first set of entries in the t1-p1 and the second set of entries in the t2-p1 to the new DBpartition comprises:
updating the algorithm to re-allocate the first set of entries of the t1-p1 to the new DBpartition; and
reallocating the second set of entries in the t1-p2 to the new DBpartition in accordance with the primary-key/foreign-key relationship.

12. The method of claim 11, wherein re-allocating the second set of entries in the t1-p2 to the new DBpartition in accordance with the primary-key/foreign-key relationship comprises:
identifying a set of primary key values associated with the first set of entries in the t1-p2 that were re-allocated to the new DBpartition; and
re-allocating, to the new DBpartition, entries in the t1-p2 having foreign key values that are equivalent to any one of the set of primary key values.

13. The method of claim 12, wherein migrating the first set of entries and the second set of entries from the existing DBpartition to the new DBpartition comprises:
writing the first set of entries into the new DBpartition in a sequential fashion with respect to one another such that different entries in the first set of entries are written into the new DBpartition at different times; and
writing the second set of entries into the new DBpartition contemporaneously with respect to corresponding entries in the first set of entries such that corresponding entries in the t1-p1 and the t2-p1 are written into the new DBpartition at the same time.

14. The method of claim 13, wherein migrating the first set of entries and the second set of entries from the existing DBpartition to the new DBpartition further comprises:
delaying removal of the first set of entries and the second set of entries from the existing DBpartition until after those entries have been written into the new DBpartition such that the first set of entries and the second set of entries are readable from at least one of the existing DBpartition and the new DBpartition throughout the entire migration period.

15. The method of claim 13 further comprising:
removing each of the first set of entries and the second set of entries from the existing DBpartition after re-updating the catalog to associate the first set of entries and the second set of entries with the new DBpartition.

16. The method of claim 7, wherein migrating the first set of entries and the second set of entries from the existing DBpartition to the new DBpartition comprises:
reading, from the existing DBpartition, a first entry from the t1-p1, wherein the first entry has a first primary key value;
reading, from the existing DBpartition, a group of entries from the t2-p1, wherein each entry in the group of entries has a foreign key value that is equivalent to the primary key value of the first entry; and writing the first entry and the group of entries into the new DBpartition at the same time.

17. The method of claim 16, wherein the group of entries includes all entries in the t2-p1 having a foreign key value that is equivalent to the primary key value of the first entry.

18. The method of claim 7, wherein determining that the criteria for repartitioning the existing DBpartition has been satisfied comprises:

determining that a size of the existing DBpartition exceeds a threshold.

19. The method of claim 7, wherein determining that the criteria for repartitioning the existing DBpartition has been satisfied comprises:

determining that a size of one or more table partitions in the existing DBpartition exceeds a threshold.

20. The method of claim 7, wherein determining that the criteria for repartitioning the existing DBpartition has been satisfied comprises:

determining that a frequency in which queries are directed toward the existing DBpartition exceeds a threshold.

21. The method of claim 7, wherein determining that the criteria for repartitioning the existing DBpartition has been satisfied comprises:

determining that a frequency in which entries are added to the existing DBpartition exceeds a threshold.

22. An apparatus comprising:

a processor; and a computer readable storage medium storing programming for execution by the processor, the programming including instructions to:

determine that a criteria for repartitioning an existing database partition (DBpartition) of a massively parallel processing (MPP) database has been satisfied, wherein the existing DBpartition comprises a first partition of a first table (t1-p1) and a first partition of a second table (t2-p1);

re-allocate a first set of entries in the t1-p1 and a second set of entries in the t2-p1 to a new DBpartition; and update a catalog to associate the first set of entries and the second set of entries with both the existing DBpartition and the new DBpartition such that queries for the first set of entries or the second set of entries received during a migration period are directed toward both the existing DBpartition and the new DBpartition;

migrate the first set of entries and the second set of entries from the existing DBpartition to the new DBpartition; and re-update the catalog to associate the first set of entries and the second set of entries with the new DBpartition after migrating the set of entries from the existing DBpartition to the new DBpartition.

* * * * *